United States Patent [19]

Weigl et al.

[11] Patent Number: 5,251,302
[45] Date of Patent: Oct. 5, 1993

[54] NETWORK INTERFACE BOARD HAVING MEMORY MAPPED MAILBOX REGISTERS INCLUDING ALARM REGISTERS FOR STORING PRIORITIZED ALARM MESSAGES FROM PROGRAMMABLE LOGIC CONTROLLERS

[75] Inventors: Edward H. Weigl, Deerfield, Ill.; David J. Sackmann, Milwaukee; Steven J. Gans, Mequon, all of Wis.

[73] Assignee: Square D Company, Palatine, Ill.

[21] Appl. No.: 815,565

[22] Filed: Dec. 26, 1991

Related U.S. Application Data

[63] Continuation of Ser. No. 179,756, Apr. 11, 1988, abandoned.

[51] Int. Cl.⁵ .................. G05B 19/00; G06F 11/30
[52] U.S. Cl. .................. 395/250; 364/131; 364/DIG. 2; 364/921; 364/926.2; 364/927.94; 364/927.95; 364/927.96; 364/929.5; 364/931.44; 364/940.2; 364/940.62; 364/940.9; 364/942.4; 364/957.6; 364/965.4; 364/943.9; 340/825.16; 340/825.36; 371/29.1
[58] Field of Search ........... 364/DIG. 1, DIG. 2, 364/131, 134, 146, 200, 900; 395/250; 340/825.05, 825.16, 825.36; 371/29.1; 370/85

[56] References Cited

U.S. PATENT DOCUMENTS

| | | | |
|---|---|---|---|
| 3,829,842 | 8/1974 | Langdon et al. | 364/900 |
| 4,167,041 | 9/1979 | Curlander et al. | 364/900 |
| 4,477,882 | 8/1984 | Schumacher et al. | 364/900 |
| 4,542,452 | 9/1985 | Fukai et al. | 364/141 |
| 4,628,437 | 12/1986 | Poschmann et al. | 364/900 |
| 4,642,791 | 2/1987 | Mallozzi et al. | 364/900 |
| 4,769,761 | 9/1988 | Downes et al. | 364/514 |
| 4,771,403 | 9/1988 | Maskovyak et al. | 364/900 |
| 4,812,819 | 3/1989 | Corsberg | 364/431.01 |
| 4,866,712 | 9/1989 | Chao | 371/5.1 |
| 4,897,777 | 1/1990 | Janke et al. | 364/140 |
| 4,912,623 | 3/1990 | Rantala et al. | 364/140 |
| 4,912,723 | 3/1990 | Verbanets, Jr. | 340/825.51 |
| 4,949,299 | 8/1990 | Pickett | 364/900 |
| 5,023,770 | 6/1991 | Siverling | 364/140 |
| 5,038,318 | 8/1991 | Roseman | 395/375 |
| 5,072,356 | 12/1991 | Watt et al. | 364/140 |
| 5,131,092 | 7/1992 | Sackmann et al. | 395/800 |

Primary Examiner—Thomas C. Lee
Assistant Examiner—Matthew C. Fagan
Attorney, Agent, or Firm—Michael J. Femal; Richard J. Graefe; Thomas K. Stine

[57] ABSTRACT

A network interface board provides a communication link between a personal computer and a network bus connecting a plurality of programmable logic controllers. The network interface board mounts in an expansion slot of the personal computer. The programmable logic controllers control the operation of various machines. The network interface board includes mailbox registers for storing messages from the network, including three different queues of alarm messages which the personal computer can access in any order. These messages could be in the form of program steps, allowing the personal computer to directly program a programmable logic controller over the communication network.

10 Claims, 3 Drawing Sheets

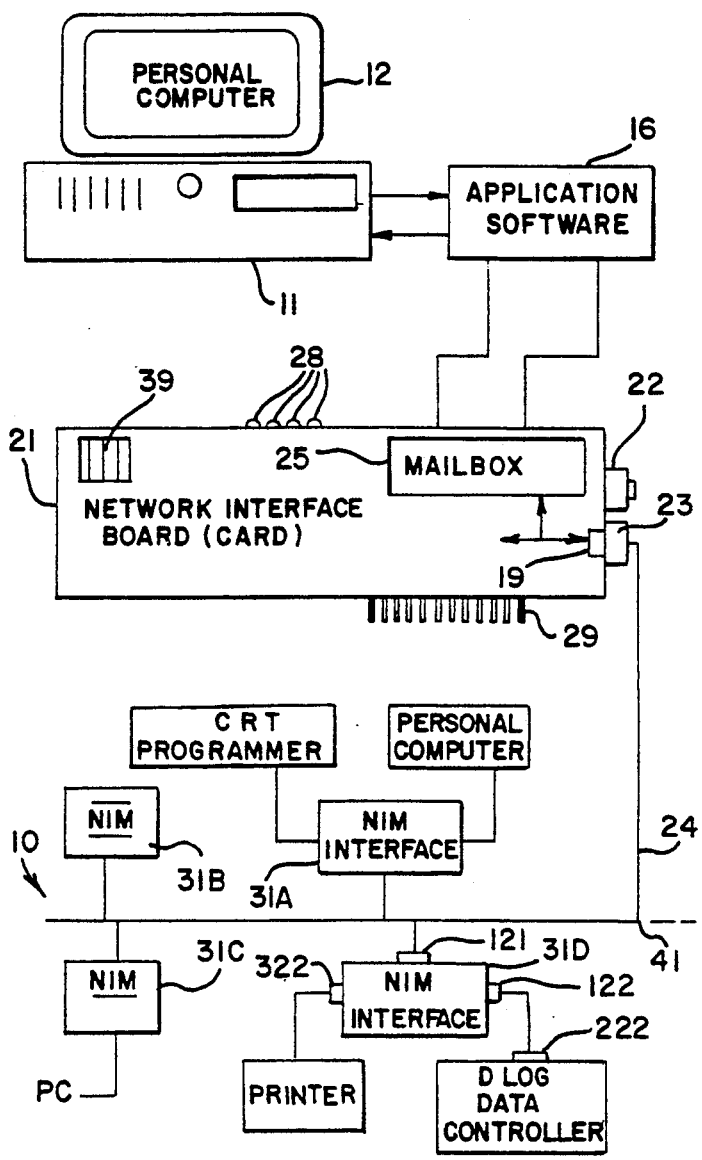
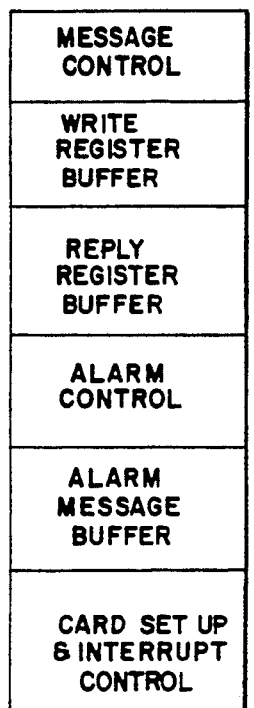
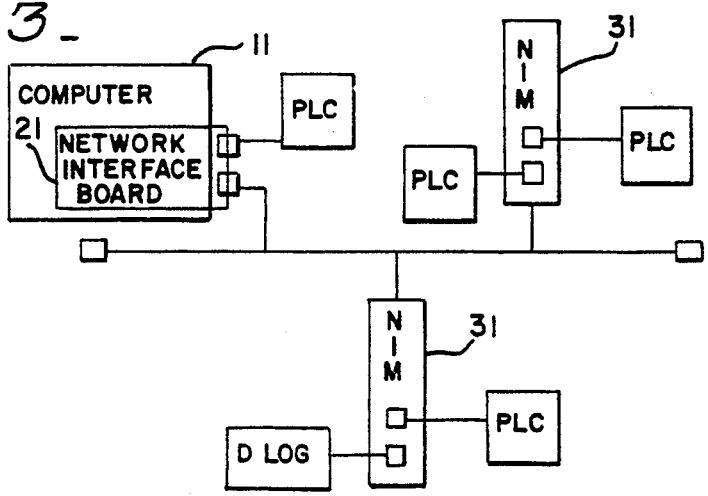

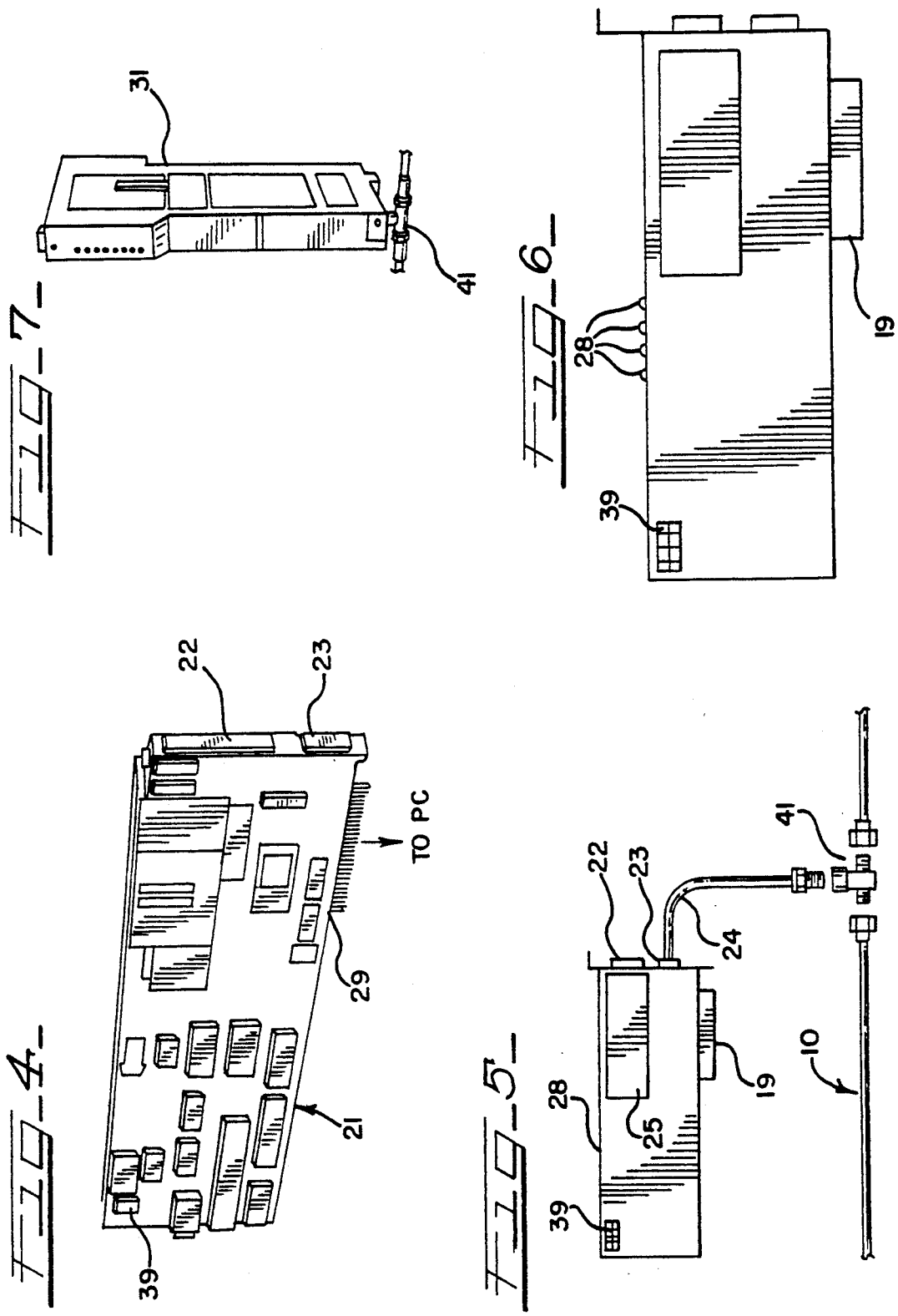

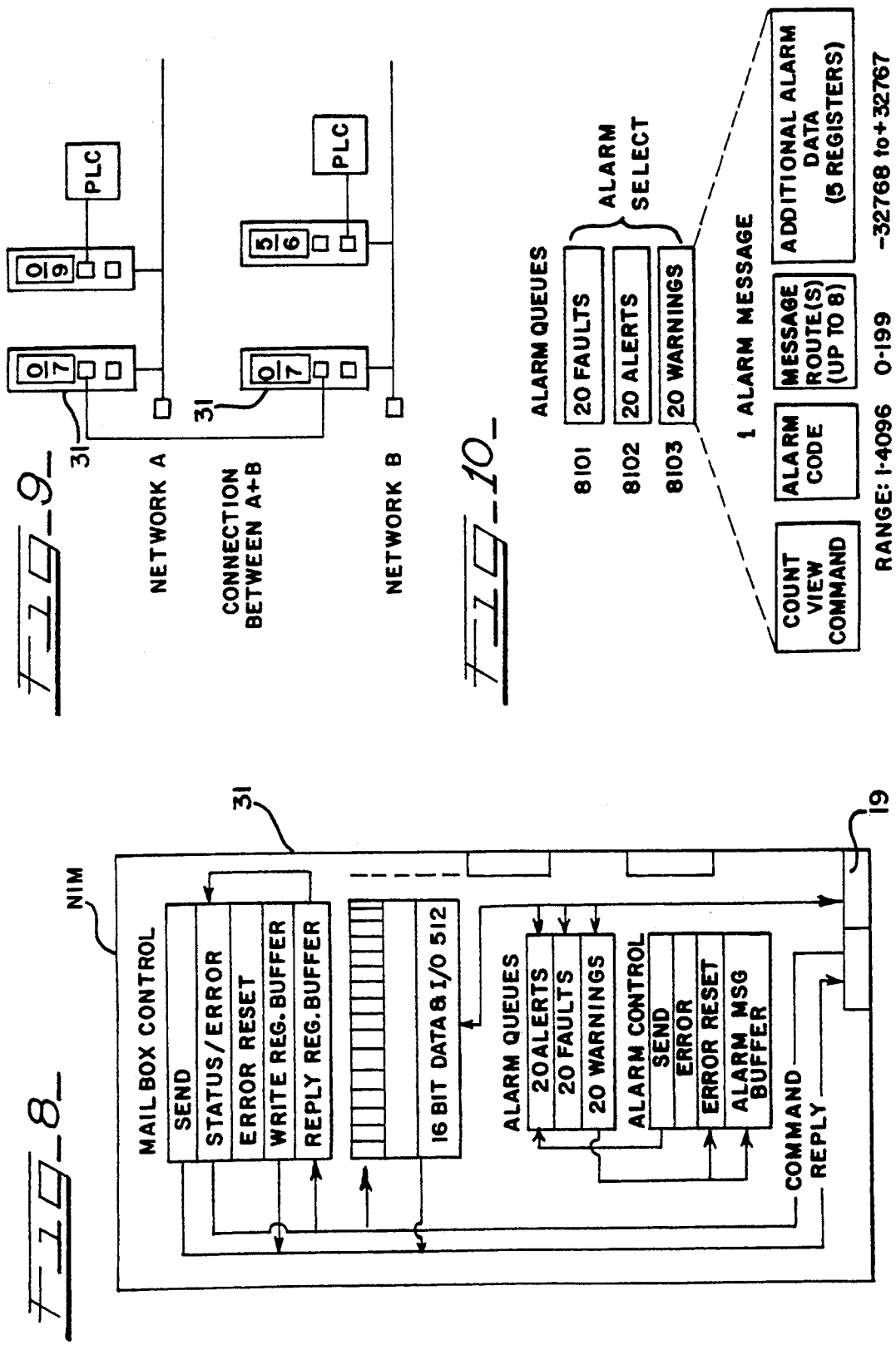

NETWORK INTERFACE BOARD HAVING MEMORY MAPPED MAILBOX REGISTERS INCLUDING ALARM REGISTERS FOR STORING PRIORITIZED ALARM MESSAGES FROM PROGRAMMABLE LOGIC CONTROLLERS

This application is a continuation of application Ser. No. 07/179,756, filed on Apr. 11, 1988 now abandoned.

REFERENCE TO RELATED APPLICATIONS

This application is related to applications filed concurrently herewith, entitled "Multiple Processor Communications System," U.S. application Ser. No. 07/179,969, filed Apr. 11, 1988, now U.S. Pat. No. 4,912,623; "Ladder Drum Sequence Controller," U.S. application Ser. No. 07/180,093, filed Apr. 11, 1988, abandoned in favor of continuation U.S. application Ser. No. 07/504,057, filed Apr. 2, 1990, now U.S. Pat. No. 5,072,356; "Peer-to-Peer Register Exchange Controller for PLCs," U.S. application Ser. No. 07/179,647, filed Apr. 11, 1988, now U.S. Pat. No. 4,897,777; and "High Speed Press Control System," U.S. application Ser. No. 07/179,743, filed Apr. 11, 1988, now U.S. Pat. No. 5,023,770. The contents of these applications are incorporated herein by reference.

1. Technical Field

This invention relates generally to an interface between a network of industrial programmable logic controllers and a general purpose processor and particularly relates to interface boards for furnishing the interface between a personal computer and the network of industrial programmable logic controllers.

2. Background of the Invention

Programmable logic controllers or programmable controllers are used to control the operations of punch presses, screw machines and automatic welders. Each programmable logic controller or PLC receives information on the operation of the punch press or screw machine on sensors and controls the operation of the punch press or screw machine through valves and switches. The PLC thus controls the operation of the punch press or screw machine from placing material into a work location, effecting the work on the raw material and removing the finished part from the work location.

Several of these PLCs can be connected to one another over communication lines to integrate the manufacture of parts through an entire factory. For example, from a central controller, raw material can be passed through several different machines and processes in completing the manufacture of goods. The communication lines across which the control and status information of the several machines travel uses serial transmission of data at baud rates of from 62.5K baud to 500K baud depending upon the distance between the PLCs and the central processor.

The order in which the communications occur on the communications network has been defined to require proper sequences of originator address, destination address, register READ and WRITE indications, register addresses and the number of registers to be read or written to. The network communications also defines the times at which each PLC can transmit and receive messages over the network communications lines in a particular manner to avoid loss of communications while assuring that each PLC has the ability to transmit necessary information within certain intervals. All of these communications definitions generally are referred to as the communications protocol.

Previously, the PLC was connected to the communications network through a simple interface circuit card, and the software program within the PLC was the driving force for following the communications network protocol in sending and receiving information. This required much of the PLC's attention and subtracted from the time available for the central processor to act upon the information it received.

Network interface modules connecting the PLCs to the communications network exist to handle the protocol in transferring information between the PLCs and the network. These network interface modules, however, fail to provide substantial features to simplify the transfer of information between the PLC and the network interface module. Connecting the PLC to a network interface module still requires the central processor software to perform extra functions beyond its normal control and processing duties. For example, a network interface module passes alarm messages from the communications network to the PLC directly as if it were a command to write or read information into a desired register. The network interface module also passes unsolicited messages directly from the communications network to the PLC at any time including when the PLC is busy acting upon the information, it requested from a distant PLC. Moreover, these network interface modules do not furnish the means to transfer information to a central processor that is non-standard to currently available personal computers such as the IBM PC compatible desktop units.

SUMMARY OF THE INVENTION

The invention furnishes a network interface presenting expansion port signals and connector for commercially available computers such as the IBM PC compatible units. The interface board (card) also simplifies programming of the personal computer. The network interface board also furnishes a mailbox for messages from the communications network, and provides a queue of alarm messages that the computer can access in any sequence it desires. The interface board through use of a direct memory address (DMA) arrangement has address locations defined for the foregoing asynchronous access to the personal computer.

The alarm messages can be of any one of three types identified as an alarm, fault and warning. Related to an automatic welding machine, an alarm message can mean that the electrodes have gone beyond their proper working position and although they still may operate, they should be changed. A fault message would indicate a broken SCR failing to conduct any current to the electrodes. A warning would indicate that the automatic welder was approaching a problem condition.

Coupled with the message registers, the network interface board provides an alarmed queue that comprises a dedicated portion of RAM memory sufficient to stack up to 20 alarm messages of each of the three types. The microprocessor then can access these alarm messages in any order desired to service them in accordance with the overall system operation.

BRIEF DESCRIPTION OF THE DRAWINGS

FIG. 1 is a block diagram indicating the connections of a network board between a personal computer and the communications network;

FIG. 2 is a diagrammatic block diagram of the registers provided on the network interface card for transferring information between the microprocessor and the communications network;

FIG. 3 is a schematic block diagram of the commercially available components and their interconnections effecting the interface card of the invention;

FIG. 4 is an isometric view of the network interface card of the invention;

FIG. 5 is a view showing the connection from the network interface card to the network cable;

FIG. 6 is another view of the network interface card showing the output ports and the terminal connection;

FIG. 7 is an isometric view of a network interface module 31 (see also FIG. 1);

FIG. 8 is a view of the registers of the network interface module of FIG. 7;

FIG. 9 shows the method of interconnecting two networks via two network interface modules; and FIG. 10 shows the three alarm queues.

DESCRIPTION OF THE PREFERRED EMBODIMENTS

FIG. 1 shows a system including a computer 11 and a monitor 12 for communicating with a communications network 10 connected to control a number of industrial devices such as punch presses, welders, etc. A network interface board (NIB) 21 of the invention is mounted in computer 11 into an empty board or card slot in the computer 11 via edge connector 29.

The network is a high-speed industrial communication system. The network has a bus configuration with a single twinaxial cable serving as the network communication pathway (see FIGS. 1 and 3). Programmable controllers (PLCs) and other devices such as computers, printers, D-LOG modules and CRT programmers are connected to the network through NIB 21 and network interface modules (NIMs) 31 to be discussed in detail below.

A computer 11 with the NIB 21 can monitor programmable controllers on the network and provide supervisory control. When it recognizes a need for control action, the computer 11 can communicate instructions to the programmable controllers. For example, the computer could detect a materials shortage situation and instruct a remote programmable controller to start conveyors to move material from an alternate site.

Further, the system allows a personal computer 11 to rapidly acquire real-time production data from programmable controllers. This data can be parts counts, machine operating times, temperatures, statistical information, and other programmable controller information. Once the production data has been acquired by the NIB 21, the personal computer 11 can prepare management reports, pass the data to another computer, or initiate real-time control action through the programmable controllers.

The network interface board (NIB) 21 mounts in a long expansion slot of an IBM Compatible Personal Computer 11. Because NIB 21 mounts in the personal computer 11, the board 21 allows the personal computer 11 to connect to the network without the extra rack and power supply which would be required if a NIM were used.

The NIB 21 has four light-emitting diode (LED) indicating lights which provide information about the operation of the board. The LEDs are designated Network, Active, TX1 and RX1 and are located as shown in FIG. 6.

A yellow "network" LED illuminates to indicate activity on the network. A green LED indicates the operational status of the board. A yellow TX-1 LED flashes to indicate when the board is transmitting data to the device connected to the RS-422 port 22. A yellow RX-1 LED flashes to indicate when the board is receiving data from the device connected to the RS-422 port 22.

In addition to the RS-422 port 22 and the opto line 19, NIB 21 includes an edge connector 29 which is the communication link between the NIB 21 and the computer 11. The computer 11 communicates to the NIB 21 through the board's edge connector in parallel mode, rather than through a serial RS-422 port.

The RS-422 port 22 allows a device other than the computer 11, for example, a personal computer, programmable logic controller, CRT programmer, or printer, to access the network through the board 21. This port can be configured for different modes of operation.

The opto-isolated port 23 is used to connect the board 21 to the network 10. This is done via the network connector cable 24 which plugs into the port 23 on the board and into a "Tee" connector 42 on the network cable, see FIG. 5.

Mounted on NIB is a DIP switch unit having four individual switches 39. These switches are set to determine which address range in the computer's memory is assigned to NIB 21 functions.

In addition to network interfacing, the NIB 21 supports programming software. With this software, the computer can be used to program and monitor a processor or data log module either by direct cable connection or over the network as shown in FIG. 3.

The application software 16 is on a disk insertable into the disk drive 11A of computer 11. Part of usable software may be in the form of firmware (ROMs or EPROMs) plugged into NIB 21. The mailbox registers 25 on NIB 21 will be described below.

An opto-isolated link 19 is positioned in board 21 in communication port 23 to enhance reliability in the face of disturbances on the communication lines from voltage surges such as induced or developed as a result of operating the presses and welders connected to the communication network 10. The opto-isolated link 19 is connected as such through a suitable opto junction box 23.

The mailbox memory registers 25 on the network interface card 21 are shown in FIG. 2. The network interface, board 21 furnishes mailbox 25 with unsolicited messages from the communications network, and provides alarm messages in a queued format which the computer 11 can access in any sequence. The interface card 21 provides a direct memory access (DMA) arrangement having address locations defined for asynchronous access by the personal computer and an interface card.

As shown in FIG. 2, the message control registers of mailbox 25 are used to set up command routes, remote address and the byte count of the message block which is used in the Read and Write operations.

The write register buffer is used to store register data that will be sent to a remote device. The reply register is used to store incoming data, other than alarm messages, received by the network interface board 21. The alarm message buffer is used to store the incoming alarm messages. The alarm control is used to control the viewing, acknowledging and resetting of the alarm messages. The setup and interrupt controls are used for set-up parameters such as baud rate, network size and RS-422 port parameters.

Importantly, the NIB 21 has three separate alarm queues. Three priorities of alarms, faults and warnings can be received from programmable controllers (PLCs) and interpreted by the personal computer 11. The personal computer 11 can display the alarms, acknowledge the alarms, store the alarm information, or take supervisory action based on the alarms received.

An example of the operation of the mailbox registers of FIG. 2 is as follows: Assume an alarm message is received that signals that welder electrodes have gone beyond their proper working position and should be changed.

This message would be received at the network interface card 24 and mailbox 25 in the alarm message buffer.

Note, of course, that the network interface card 21 set up and interrupt control registers, as shown in FIG. 2, are initially set up with the proper network communication parameters, as is known.

When an unsolicited alarm message is received, the alarm control registers will then control viewing, acknowledging and resetting of alarm messages. The computer will acknowledge the alarm message and set the applicable acknowledge registers in the alarm control section of the mailbox. Once the alarm message is acknowledged, the alarm control register will cause that particular message to be reset or cleared.

If it is necessary to send a message to the various devices, for example to devices that originate an alarm, that message will be stored in the write register buffer. The message control buffer will then be used to set up the route, the remote address and the byte count of the message block to be sent out. The reply register buffer may be used to store all incoming messages to the NIB 21. Alarm messages are similar to write messages except that alarm messages send a constant value (alarm code) rather than variable data from a storage register. The receiving device can be programmed to respond to various alarm codes in an appropriate manner.

As shown in FIG. 10, an area of memory is set aside as three alarm queues. Each alarm queue can store 20 alarm messages in the order in which they are received. Each stored alarm message contains the alarm code, the network route from the device that sent the alarm and (optionally) some additional alarm data.

The three alarm queues are called Warnings, Alerts and Faults. Having three separate queues allows the alarm messages to be categorized in different levels. Generally, Warnings are considered the least serious kind of alarm, Alerts are more serious, and Faults are the most serious. However, the manner in which each type is responded to depends on how the user program is designed.

Each of the three alarm queues has a register address, allowing the processor to direct alarm messages to the appropriate queue.

Messages can be placed in an alarm queue via alarm commands or write commands. When a write command is used, up to six registers of data can be written to a message location in an alarm queue. The first register serves as the alarm code, while the other five registers can provide additional data from the initiating device. Not only does a write rung allow more information to be sent to the queue than an alarm rung, the data is dynamically definable. That is, the alarm "code" information may be loaded into the processor register based on real-time I/0 status and other real-time conditions. With an alarm rung, the alarm code is fixed when the ladder program is developed.

The user program can utilize opcodes to view an alarm, acknowledge an alarm (to the device that sent it), and clear the alarm from the queue.

When an alarm is received in one of the alarm queues, the change flag for that queue is set to its new count.

Each alarm change has a selected flag location. For example, the locations could be given s:

| Fault Queue | 2H |
| Alert Queue | 3H |
| Warning Queue | 4H |

The user program can be designed to poll for a flag change or be interrupted by a flag change. The program can then view the error code and take other appropriate action.

To view an alarm, the user program selects which alarm in the queue it wishes to see and copies the alarm data to a buffer where it can be viewed. Following is the procedure for viewing an alarm message. Refer to FIG. 10.

1. The user program detects an Alarm Change flag.
2. The user program checks the Alarm Count location for the appropriate queue to determine the number of alarm messages there.
3. The user program selected which message (1 to 20) in the queue to view. It places this number in the Alarm Select location.
4. The user program places the view command opcode in the Alarm Command location.
5. The user program sets the Go Flag (240H) to a non-zero value.
6. When the Go Flag is cleared, the selected message is available for viewing. Routing information for this message is available in the Message Route Buffer.

If the application requires it, the user program can acknowledge the alarm (send the alarm code back to the originating device).

When a write rung has been used to send a group of registers as an alarm message, only the first register is written back to the initiating processor as an acknowledgment.

The procedure for acknowledging an alarm message is as follows:

1. The user program sets the number of the alarm message to be acknowledged in the Fault Queue, Alert Queue or Warning Queue.
2. The user program places the acknowledge command opcode in a designated Alarm Command location.
3. The user program puts a value in a designated Acknowledge Register that determines which register in the initiating device the alarm code is sent back to.
4. The user program sets the Go Flag to a non-zero value.
5. The NIB 21 clears the Go Flag when the message has been acknowledged.

Alarm messages remain in the alarm queues until they are cleared by the user program. When an alarm queue is full, the NIB 21 will accept no more alarm messages for that queue.

Alarm messages can be cleared individually (usually after being viewed) with the Clear command. There is also a command for simultaneously clearing all three alarm queues.

Following is a procedure for clearing individual alarms.

1. The user program sets the number of the alarm to be cleared in the Alarm Select location.
2. The user program places the clear command opcode in the Alarm Command location.
3. The user program sets the Go Flag to a non-zero value.
4. The NIB 21 board clears the Go Flag when the message has been cleared.

To clear all alarms, the following procedure may be used.

1. The user program places the Clear All Alarm opcode in the Alarm Command location.
2. The user program sets the Go Flag to a non-zero value.
3. The NIB 21 clears the Go Flag when all the alarm queues have been cleared.

Devices on the network can write data into the processor equivalent (mailbox) registers contained on the NIB 21. This allows the NIB 21 to receive unsolicited data.

A Register Change Flag location contains the address of the last register to be written to. If a block of registers is written to, the Register Change Flag location contains the lowest register number of the block.

By monitoring the Register Change Flag, the user program need not poll all 512 registers to detect a change. The NIB 21 board can also be configured to generate an interrupt to the personal computer whenever a mailbox register is written to.

Register addresses in the Register Change Flag are only cleared on power-up and restart by NIB 21. Repetitive writes to the same mailbox register will not change the address in the Register Change Flag after the first write. However, each write to the mailbox registers will generate an interrupt to the computer 11, if this interruption condition is enabled.

The NIM 31 manages network communication, relieving the user program of these tasks. As will be explained, the NIM 31 can flag the user program when a reply, alarm condition or unsolicited message is received. An additional RS-422 port 22 is provided in each NIM 31, see FIG. 3, which allows a second device to access the network through the NIM. That is, each NIM 31 can support two devices. Note that only the NIMs 31 are connected to the network 10. The PLCs and the devices (see FIG. 1) are connected through the NIMs 31 to the network line 24.

Refer now to FIGS. 1, 7 and 9. The NIM 31 allows two devices (programmable controllers, CRT programmers, computers, printers, etc.) to connect to the network. Since a maximum of 100 network interfaces modules NIMs 31 can be connected to a single network and since each NIM 31 can connect two devices to the network, a network can have a maximum of 200 devices. However, even more devices can communicate by connecting multiple networks together as indicated in FIG. 9.

The network interface module NIM 31 mounts in a register slot of a programmable controller I/O rack assembly. The NIM 31 has a two-digit thumbwheel for setting a network address number between 00 and 99. This address number identifies the NIM module, and the devices connected to it, and also sets the communication priority that the NIM module has in relation to the other NIMs on the network.

The NIM has two RS-422 COMM ports to which the programmable controllers or other devices are connected. These port numbers are combined with the NIM address number to identify the devices for network communication.

We claim:

1. A network interface board for facilitating communication between a personal computer having a memory space and a plurality of programmable logic controllers connected in a communication network which is arranged in a bus configuration for controlling machines, said network interface board comprising:

(a) terminal means (29) for connecting said network interface board (21) to said personal computer.
    (b) port means (23) for connecting said network interface board to said communication network;
    (c) mailbox memory means (25), connected to said port means and to said terminal means, for reading and writing messages through said terminal means by said personal computer and through said port means by said programmable logic controllers;
    (d) reply register means in said mailbox memory means for storing messages received from said programmable logic controllers and for sending said received messages to said personal computer;
    (e) write register means in said mailbox memory means for storing and sending messages from said personal computer to said programmable logic controllers;
    (f) control register means in said mailbox memory means for setting routes and addresses of said programmable logic controllers to selectively send messages stored in said write register means to said programmable logic controllers;
    (g) alarm register means in said mailbox memory means for storing alarm messages received from said programmable logic controllers and for sending said alarm messages to said personal computer;
    (h) address mapping means for mapping said reply register means, said write register means, and said alarm register means into the memory space of said personal computer, said personal computer directly accessing said replay register means, said write register means, and said alarm register means in a predetermined sequence; and wherein said alarm messages include fault messages, alert messages, and warning messages, and further wherein said alarm register means include separate, prioritized alarm queues, each alarm queue for respectively storing said fault messages, said alert messages, and said warning messages.

2. A network interface board as defined in claim 1, wherein said terminal means comprises an edge connector for insertion into an expansion card slot of said personal computer to provide a parallel connection to said personal computer, and further wherein said port means provides a serial connection for direct access to said communication network.

3. A network interface board as defined in claim 1, wherein said personal computer directly accesses said alarm queues in a predetermined sequence.

4. A network interface board as defined in claim 1, wherein said port means is opto-isolated for connection to said communication network.

5. A network interface board as defined in claim 1, wherein said personal computer directly programs one of said programmable logic controllers by storing program step messages in said write register means and sending said program step messages to said one programmable logic controller.

6. A network interface board as defined in claim 1, wherein said network interface board includes an input-output serial RS-422 port for connecting to an intelligent device by direct cable connection.

7. A network interface board as defined in claim 5, wherein said intelligent device is a programmable logic controller.

8. A network interface board as defined in claim 5, wherein said intelligent device is a personal computer.

9. A network interface board as defined in claim 5, wherein said intelligent device is a printer.

10. A network interface board as defined in claim 5, wherein said intelligent device is a CRT programmer.

* * * * *